United States Patent [19]
Johnson et al.

[11] 3,970,797
[45] July 20, 1976

[54] DIGITAL CONFERENCE BRIDGE

[75] Inventors: David A. Johnson, Easton; William C. Towle, Sudbury, both of Mass.

[73] Assignee: GTE Sylvania Incorporated, Stamford, Conn.

[22] Filed: Jan. 13, 1975

[21] Appl. No.: 540,717

[52] U.S. Cl. ............................ 179/15 AT; 179/1 CN
[51] Int. Cl.² ...................... H04M 3/56; H04M 1/58
[58] Field of Search ......... 179/1 CN, 15 AT, 15 AL

[56] References Cited
UNITED STATES PATENTS

| | | | |
|---|---|---|---|
| 3,165,588 | 1/1965 | Holzer | 179/15 AT |
| 3,293,369 | 12/1966 | Schroeder | 179/15 AT |
| 3,428,754 | 2/1969 | Hoyler | 179/15 AT |
| 3,530,246 | 9/1970 | Kelly | 179/1 CN |
| 3,530,247 | 9/1970 | Huber | 179/1 CN |
| 3,824,344 | 7/1974 | James | 179/1 CN |
| 3,828,146 | 8/1974 | Lewis | 179/15 AT |

Primary Examiner—Kathleen H. Claffy
Assistant Examiner—E. Matt Kemeny
Attorney, Agent, or Firm—David M. Keay; Elmer J. Nealon; Norman J. O'Malley

[57] ABSTRACT

A Digital/analog conference arrangement for up to M (15) digital subscribers. The digital signals are sensed, and up to N (3) are converted at the same time to analog signals which are processed in an analog bridge, then converted to digital signals which are transmitted to the appropriate subscribers. The voice signals of each subscriber are encoded by the continuously variable slope delta modulation (CVSD) technique into a serial digital bit stream, which are time-multiplexed into 15 input channels.

8 Claims, 9 Drawing Figures

DIGITAL CONFERENCE BRIDGE

BACKGROUND OF THE INVENTION

This invention relates to conference bridge apparatus for enabling several subscribers to converse with each other in a telephone conference. More particularly, it is concerned with conference bridge apparatus for use in communication systems utilizing digital signals.

Commonly employed telephone communication systems usually include provisions for permitting several subscribers to engage in a telephone conference. Recently there has been greater use of digital signal techniques in telephone communication systems. For certain types of digital signal techniques equipment for interconnecting several subscribers in a telephone conference is available. However, existing types of telephone conference equipment cannot be used with certain digital techniques such as the so-called continuous delta modulation techniques.

SUMMARY OF THE INVENTION

Digital conference bridge apparatus in accordance with the present invention may be employed with various digital signal techniques including continuous delta modulation techniques. The apparatus includes a plurality of M input channels for transmitting digital signals and a plurality of M associated output channels. A detection means is coupled to the input channels in order to detect the presence of digital signal information on the input channels. The apparatus also includes a group of N digital-to-analog converting means for converting digital signals to analog signals. A decoder means is coupled to the detection means and individually couples the digital-to-analog converting means to up to N input channels which have digital signal information present. An analog bridge means has N input connections and each of the digital-to-analog converting means is coupled to a different one of these input connections. The analog bridge means has N+1 output connections, each of N of these output connections corresponding to an input connection and the other output connection being a summing output connection. The analog bridge means produces at each of these N output connections the analog signals which are present at all of the input connections except for the one corresponding to that particular output connection. In addition, at the summing output connection the analog bridge means produces an analog signal which is the sum of the analog signals present at all of the input connections. A group of N+1 analog-to-digital converting means for converting analog signals to digital signals are coupled to the N+1 output connections of the analog bridge means. An output multiplexing means is coupled to the analog-to-digital converting means, to the decoder means, and to the plurality of output channels. The output multiplexing means applies to digital signals from particular analog-to-digital converting means to particular output channels.

BRIEF DESCRIPTION OF THE DRAWINGS

Additional objects, features, and advantages of digital conference bridge apparatus in accordance with the present invention will be apparent from the following detailed discussion together with the accompanying drawings wherein.

DETAILED DESCRIPTION OF THE INVENTION

General

Figure 1:
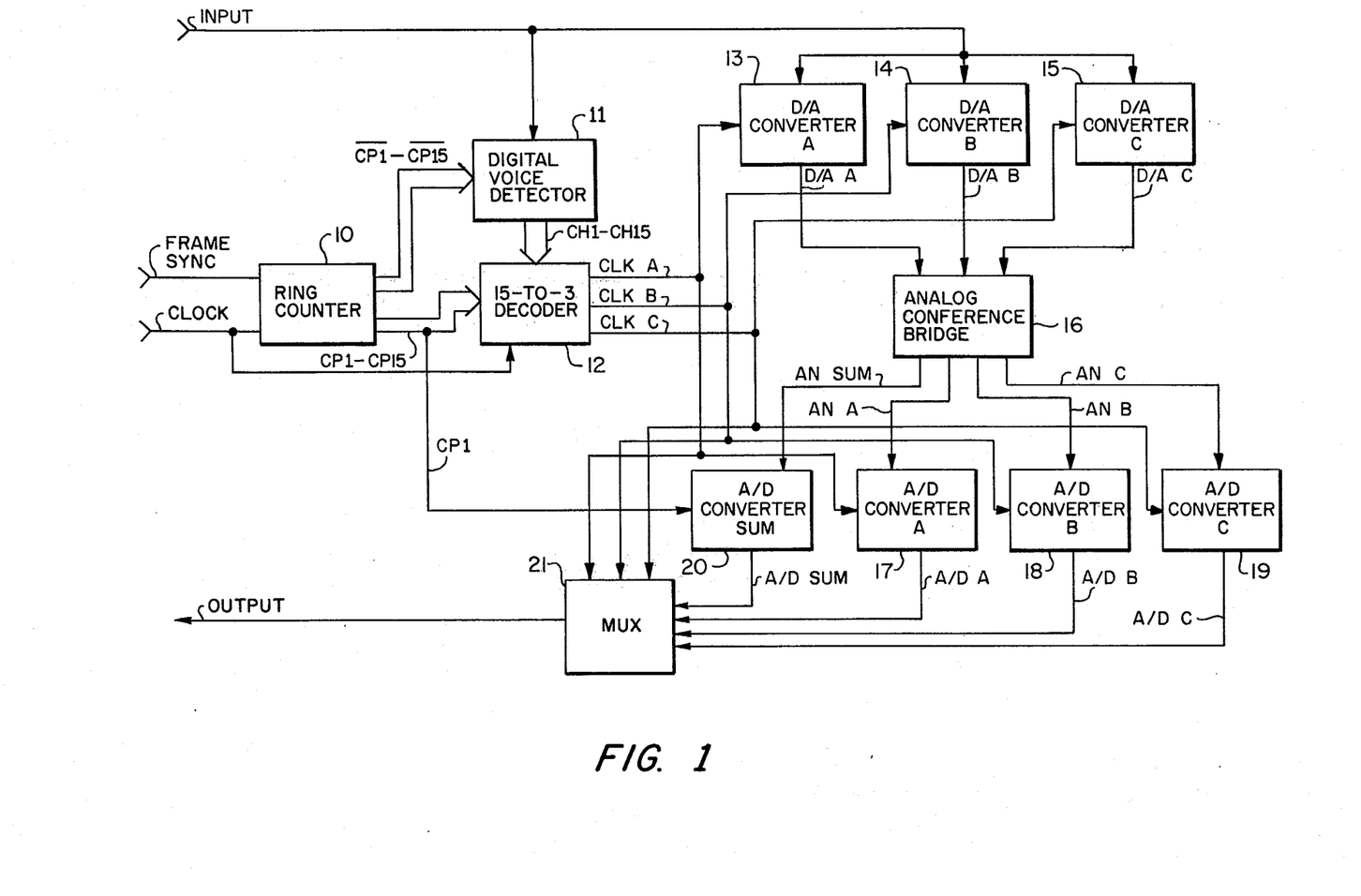
FIG. 1 is a block diagram of a digital conference bridge in accordance with the present invention.

The digital conference bridge in accordance with the present invention illustrated in the block diagram of FIG. 1 is designed for handling telephone conferences involving up to 15 digital subscribers. The specific embodiment of the apparatus as shown and described herein is concerned with the continuously variable slope delta modulation (CVSD) technique of digitizing voice signals into a serial digital bit stream. The digital bit streams from up to 15 subscribers are time division into 15 available input chanels, a single bit occurring during each transmitting time period of each channel, and are transmitted on the INPUT line. The digital information is received and processed by the digital conference bridge of FIG. 1 and appropriate digital information encoded in the CVSD format is time division multiplexed and transmitted within 15 available corresponding output channels on the OUTPUT line.

The digital conference bridge employs a digital voice detector 11 which continuously monitors the 15 input channels during a conference and determines which channels have digital signal voice information present on them. More particularly, the digital voice detector 11 checks the INPUT line during each time period of each input channel. An indication of the presence of digital signal voice information on any of the 15 channels is indicated by appropriate channels CH1 through CH15 from the digital voice detector 11 to a 15-to-3 decoder 12. Both the digital voice detector 11 and the 15-to-3 decoder 12 operate in synchronism with the time periods of the time division multiplexed input channels under control of clock pulses CP1 through CP15 (or $\overline{CP1}$ through $\overline{CP15}$) from a ring counter 10.

The 15-to-3 decoder 12 can receive up to three of signals CH1 to CH15. For each signal received the decoder produces a clock signal CLK A, CLK B, or CLK C. Each clock signal CLK A, CLK B, or CLK C occurs coincident with the particular clock pulse CP1 through CP15 associated with the received signal CH1 through CH15. Thus, each clock signal CLK A, CLK B, or CLK C becomes associated with an input channel. At any instant only three channels are recognized by the decoder 12 regardless of the number of channels on which voice signals are present. Limiting the number of channels which are recognized at any one instant to three reduces the noise contributed by each channel and does not significantly degrade the capability of the system since the presence of voice signals on four or more channels at the same instant would occur very infrequently.

The bridge apparatus, as illustrated also includes three digital-to-analog converters 13, 14, and 15. The digital-to-analog converters are appropriate for the particular digital encoding and decoding techniques being employed by the system. In this specific embodiment CVSD type digital-to-analog converters are employed. The three digital-to-analog converters 13, 14, and 15, designated A, B, and C, form part of three possible paths for signals from up to three of the channels as designated by the CLK A, CLK B, and CLK C clock signals. The digital-to-analog converters 13, 14, and 15 convert the incoming digital signals from the respective selected channels to analog signals D/A A, D/A B, and D/A C, respectively.

The analog outputs D/A A, D/A B, and D/A C from the three digital-to-analog converters 13, 14, and 15 are combined in well-known manner in an analog conference bridge 16. The analog conference bridge 16 has four outputs AN A, AN B, AN C, and AN SUM. As is well understood in the operation of analog conference bridge circuits the AN A output is an analog signal which contains the analog signals present on all the inputs other than its own corresponding input. That is, the AN A signal contains the analog signals, if any, present at the D/A B and D/A C inputs. Similarly, outputs AN B and AN C contain the analog signals present at the two inputs D/A A and D/A C, and D/A A and D/A B, respectively. The AN SUM output is a summing output and the AN SUM signal contains all three input signals D/A A, D/A B, and D/A C.

The four outputs AN A, AN B, AN C, and AN SUM of the analog conference bridge 16 are each applied to an analog-to-digital converter 17, 18, 19, and 20, respectively. Each converter encodes the received analog signal to a digital signal in accordance with the CVSD technique employed by the system.

The outputs A/D A, A/D B, A/D C, and A/D SUM of the four analog-to-digital converters 17, 18, 19, and 20, respectively, are applied to an output multiplexer 21. The multiplexer is controlled by the clock signals CLK A, CLK B, and CLK C from the 15-to-3 decoder 12. These signals control the operation of the multiplexer so that the digital signals are properly time division multiplexed for transmission over the OUTPUT line to the subscribers. That is, the output channel designated by the CLK A clock signal receives only the A/D A signal. The A/D A signal does not contain voice signals derived from its associated input channel but only those derived from the other two recognized input channels designated by the CLK B and CLK C clock signals. Similarly, the output channel designated by the CLK B signal receives the A/D B signal containing voice signals derived from the channels designated by the CLK A and CLK C clock signals; and the output channel designated by the CLK C signal receives the A/D C signal containing voice signals derived from the channels designated by the CLK A and CLK B clock signals. All the other channels involved in the conference receive the A/D SUM signal which is the sum of the voice signals present on all the recognized input channels.

Timing

As mentioned previously, in the specific embodiment illustrated up to 15 subscribers can be interconnected by the conference bridge arrangement. The data in each channel is transmitted at a 38.4 KHz bit rate. The total frame time for transmitting one bit on each of the 15 channels is 26 microseconds. Each time period for transmitting a single bit is 1,736 nanoseconds, a rate of 576 KHz.

Figure 9:
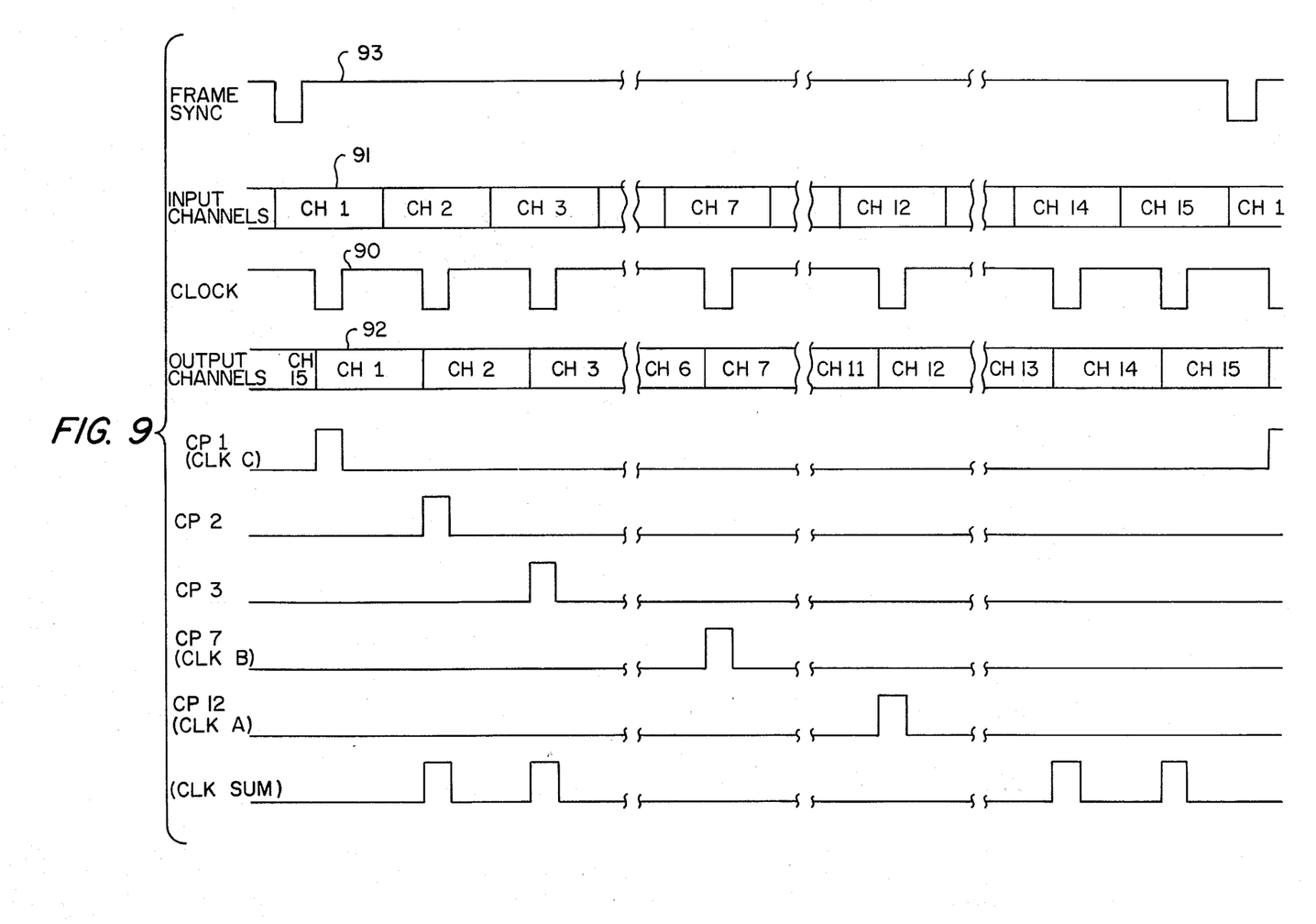
FIG. 9 is a timing diagram useful in explaining the operation of the apparatus.

The apparatus receives squarewave CLOCK pulses 90 (FIG. 9) at the 576 KHz rate as from an oscillator elsewhere in the system. The CLOCK pulses are synchronized with the input and output channel time periods 91 and 92 as shown in FIG. 9. Each negative-going CLOCK pulse 90 is of 434 nanoseconds duration and occurs centrally of the 1,736 nanosecond time period of an input channel. Each output channel time period 92 starts on the leading edge of a negative-going CLOCK pulse 90, and therefore, lags its associated input channel by 651 nanoseconds.

Figure 2:
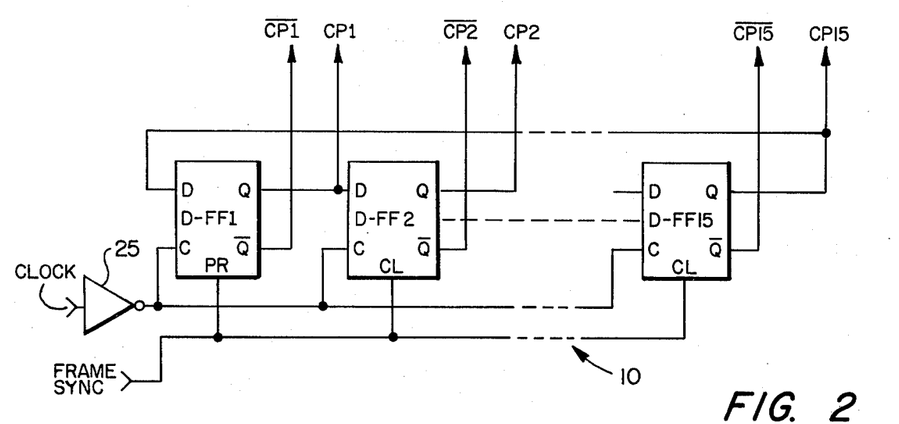
FIG. 2 is a logic diagram of some of the timing circuitry of the apparatus of FIG. 1.

The CLOCK pulses 90 are applied to a ring counter 10 as shown in detail in FIG. 2. The ring counter 10 is a well-known arrangement of 15 D-type flip-flops D-FF1 through D-FF15 interconnected as illustrated in FIG. 2. CLOCK pulses 90 are applied to the flip-flops through an inverter 25. A FRAME SYNC pulse 93 (FIG. 9) which originates elsewhere in the system is employed to insure that the flip-flops are cleared at the end of a frame of 15 channel time periods and that the first flip-flip D-FF1 is properly preset. Outputs are taken from the Q outputs of the flip-flops to provide clock pulses CP1 through CP 15 in a recurring sequence on each of 15 lines in series. Clock pulses CP1, CP2, CP3, CP7, and CP12 are shown in FIG. 9. Inverted clock pulses $\overline{CP1}$ through $\overline{CP15}$ are taken from the $\overline{Q}$ inputs of the flip-flops D-FF1 through D-FF15.

Detection and Decoding

Figure 3:
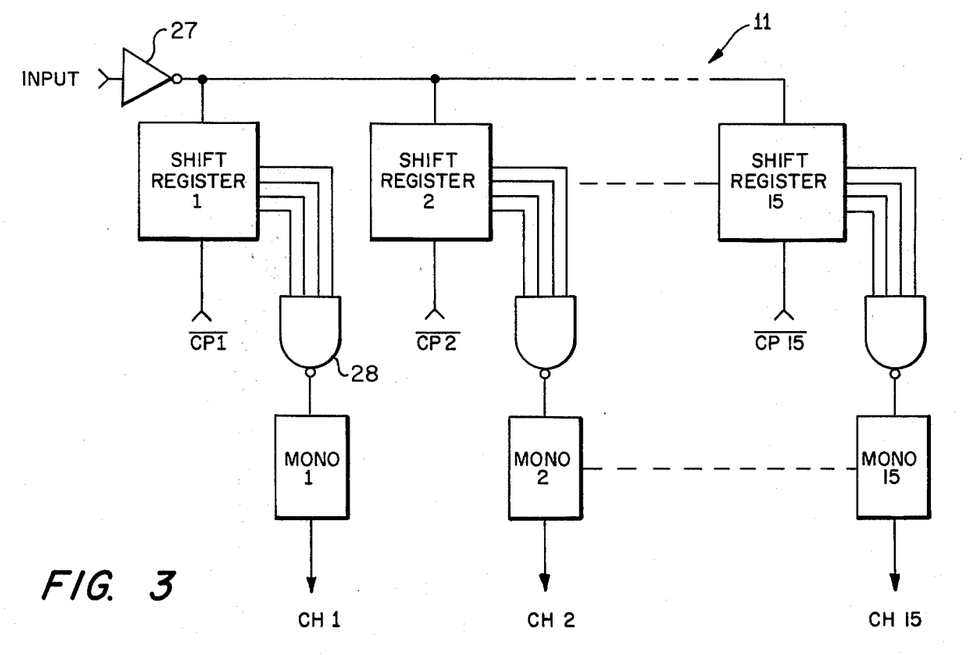
FIG. 3 is a logic diagram of a digital voice detector of the apparatus.

The digital voice detector 11 for detecting the presence of voice signals in the input channels is illustrated in detail in the logic diagram of FIG. 3. With the CVSD technique when no voice signal is present on a channel a series of alternating logic 1's and 0's occur. The presence of a voice signal is indicated by a change from that pattern including groups of logic 1's in series occurring at frequent intervals.

The detector 11 includes a set of 15 shift registers, shift register 1 through shift register 15, each of which is adapted to store four digital bits from its associated input channel. The INPUT line is connected through an inverter 27 to the inputs of the 15 shift registers. The shift registers are clocked by the clock pulses $\overline{CP1}$ through $\overline{CP15}$, respectively, so that data for each channel is entered in an associated shift register. Thus, the four most recent input bits are stored in the shift register for each channel.

The four stages of each shift register are connected through a NAND gate, such as NAND gate 28, to a monostable multivibrator, such as MONO 1. Whenever a shift register stores a group of four digits indicating the presence of four successive 1's being transmitted on its associated input channel, the NAND gate triggers the associated monostable multivibrator MONO 1 through MONO 15. The triggered monostable multivibrator MONO 1 through MONO 15 produces a low level output signal CH1 through CH15, respectively, indicating that voice information is present on the associated input channel. The monostable multivibrators have an operating period of 100 milliseconds after being triggered on. This period has been found sufficient to insure that monostable multivibrator does not go off while voice information is present on the associated input channel.

Figure 4:
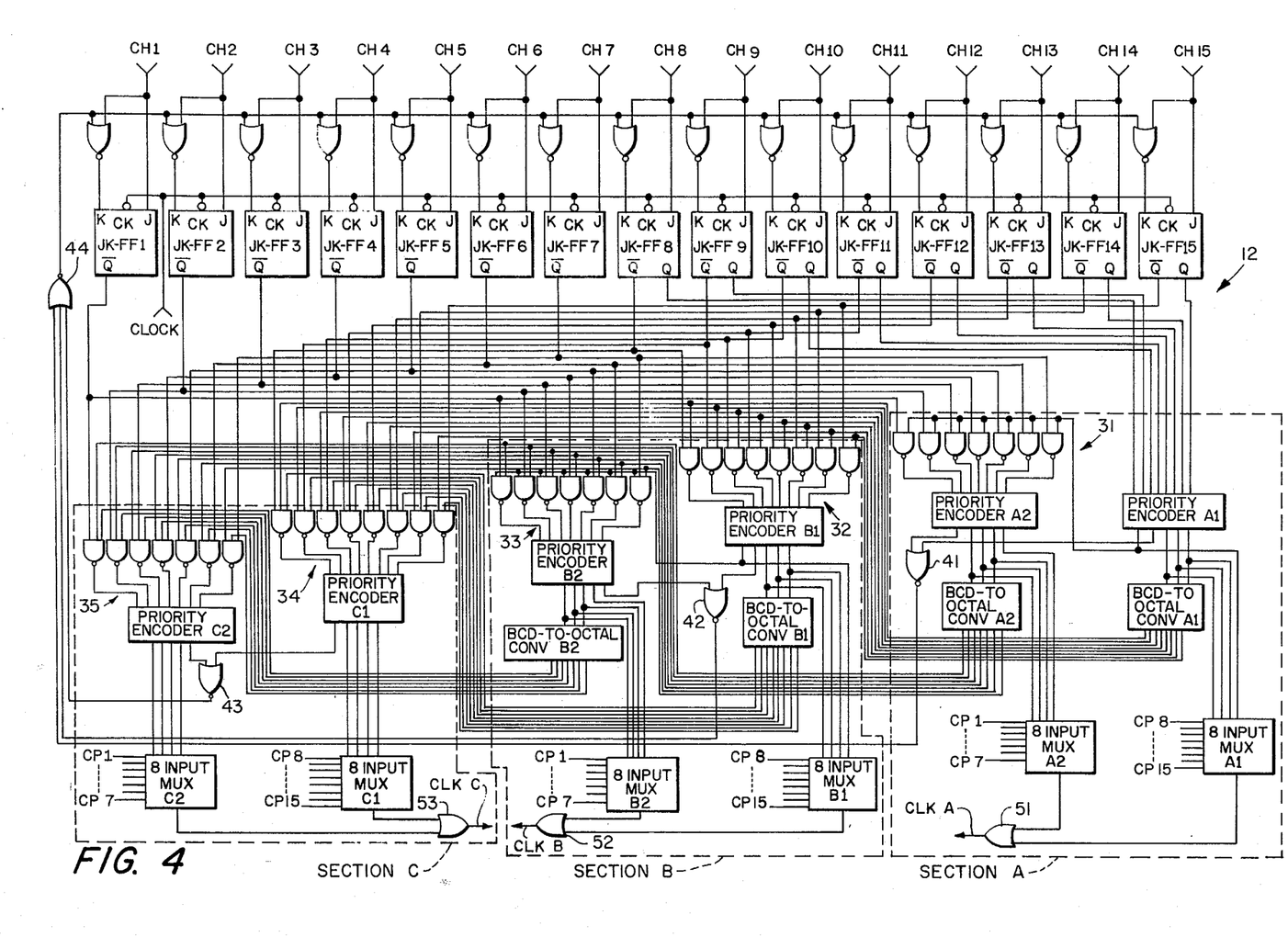
FIG. 4 is a logic diagram of a decoding section of the apparatus.

The CH1 through CH15 voice present indications are applied to the 15-to-3 decoder 12 which is shown in detail in FIG. 4. The decoder 12 employs an arrangement of 15 JK flip-flips JK-FF1 through JK-FF15, one being associated with each input channel. The associated CH line, for example CH15 for input channel 15, is connected directly to the J-input and through a NOR gate, for example NOR gate 30, to the K-input. The clock inputs of all the flip-flops receive the 576 KHz CLOCK signal 90 (FIG. 9).

In the absence of an indication from the associated monostable multivibrator in the detector 11, the CH signal is high maintaining the associated Jk flip-flop in the set condition with its Q output producing a high level signal and its $\overline{Q}$ output producing a low level signal. When the associated CH signal goes low indicating the detection of voice information by the detector 11 and assuming the other input to the NOR gate, for example NOR gate 30, is low, the output of the NOR gate becomes high. The JK flip-flop will be switched on the next CLOCK pulse to the reset condition, thereby storing the indication, with the Q output producing a low level signal and the $\overline{Q}$ output producing a high level signal.

The decoder 12 includes three decoder sections A, B and C arranged in order. Each section contains a pair of priority encoders A1 and A2, B1 and B2, and C1 and C2, respectively. The particular arrangement of two priority encoders in each section as shown is required because the commercially available priority encoders have provisions for only eight input lines. (Some simplification would be possible if a 15-input priority encoder where commercially available as a component.) Each priority encoder operates to produce a binary coded decimal (BCD) output signal indicating the one of its eight inputs receiving a low level input signal to which the priority encoder is responding. The priority encoder responds only to a single input signal regardless of the number of input signals being received. In the arrangement shown in FIG. 1 the priority is awarded to channels in reverse numerical order.

In section A the Q inputs of JK flip-flops JK-FF8 through JK-FF15 are connected directly to the eight inputs of priority encoder A1 with the input from the flip-flop JK-FF15 being of highest priority. The $\overline{Q}$ output of the JK flip-flops JK-FF1 through JK-FF7 are connected to a group of seven NAND gates 31 which are connected to seven inputs of priority encoder A2. The input from the flip-flop JK-FF7 is connected to the input of highest priority. When the priority encoder A1 is not receiving any input signals it produces a high level signal to the NAND gates 31 permitting a signal from any of flip-flops JK-FF1 through JK-FF7 to pass through to priority encoder A2. When priority encoder A1 is responding to an input signal from one of flip-flops JK-FF8 through JK-FF15, it produces a low level signal to the NAND gates 31 preventing any signals from flip-flops JK-FF1 through JK-FF7 from passing through to the priority encoder A2. Thus, the arrangement of priority encoders A1 and A2 and NAND gates 31 together with the connections to the JK flip-flops provides a combination which responds to only a single input signal, the one indicating the channel of highest number.

The priority encoders A1 and A2 of section A have their BCD outputs connected to BCD-to-octal converters A1 and A2, respectively. Each output line from the BCD-to-octal converter (eight from A1 and seven from A2) in effect is associated with an input signal to the priority encoders A1 and A2 from the Jk flip-flops. The 15 outputs from the combination of the two BCD-to-octal converters A1 and A2 are normally high. When one of the priority encoders A1 or A2 responds to an input signal, the appropriate output signal from the BCD-to-octal converter A1 or A2 goes low.

The outputs of the priority encoders A1 and A2 of section A are also connected to 8-input multiplexers A1 and A2, respectively. Clock pulses CP8 through CP15 are applied to the multiplexer A1 and clock pulses CP1 through CP7 are applied to the multiplexer A2. Each multiplexer passes to its output as a high level pulse every clock pulse which corresponds to the coded signal from the priority encoders. The outputs of the multiplexers A1 and A2 are connected to an OR gate 51, the output of which is the CLK A clock signal. Thus, when one of the priority encoders A2 or A2 responds to an indication stored in one of the JK flip-flops JK-FF1 through JK-FF15, CLK A clock signal pulses are produced coincident with the CP clock pulse associated with the same input channel.

Section B includes two priority encoders B1 and B2, two BCD-to-octal converters B1 and B2, two 8-input multiplexers B1 and B2, and an OR gate 52 which are interconnected similarly to the elements of section A. A group of eight NAND gates 32 are connected to the inputs of priority encoder B1 and a group of seven NAND gates 33 are connected to the inputs of priority encoder B2. The 15 NAND gates 32 and 33 each have one input connected to the $\overline{Q}$ output of an associated one of the JK flip-flops JK-FF1 to JK-FF15. The 15 NAND gates also each have an input connected to the associated output of the BCD-to-octal converters A1 and A2 of section A. The seven NAND gates 33 have an input to the output connection of priority encoder B1 which is high in the absence of any input to priority encoder B1 and which is low when priority encoder B1 is responding to an input.

All of the NAND gates 32 and 33 are normally enabled by high level signals from the BCD-to-octal converters A1 and A2 of section A. When a first indication becomes stored in one of the JK flip-flops, the low level signal from the associated output line of either BCD-to-octal converter A1 or A2 inhibits the appropriate one of NAND gates 32 and 33. When a second indication becomes stored in one of the JK flip-flops of lower priority order than the first, the signal from the $\overline{Q}$ output of the JK flip-flop passes through the associated NAND gate to priority encoder B1 or B2. The priority encoder responds to this signal producing appropriate BCD signals to the associated BCD-to-octal converter B1 or B2 and 8-input multiplexer B1 or B2. Only a single input can be responded to by the combination of priority encoders B1 and B2 in the same manner as explained hereinabove with respect to section A.

The BCD output signal from a priority encoder B1 or B2 designating a specific input channel is applied to an associated BCD-to-octal converter B1 or B2. The BCD-to-octal converter operates to produce high output levels at all of the 15 output lines except for a low level signal on the line associated with the specific input channel. The BCD output signal of the priority encoder B1 or B2 is also connected to an associated 8-input multiplexer B1 or B2. Clock pulses CP8 through CP15 are applied to multiplexer B1 and clock pulses CP1 through CP7 are applied to multiplexer B2. The outputs of the multiplexers are connected to the OR gate 52. The output of the OR gate 52 is the CLK B clock signal pulses which are coincident with the CP clock pulses associated with the input channel to which section B is responding.

If the second indication to become stored in one of the JK flip-flops JK-FF1 through JK-FF15 is of higher priority (higher number channel) than the first, a priority encoder A1 or A2 in section A responds to the second indication. A priority encoder B1 or B2 of section B then responds to the first indication. Thus, section A and consequently the CLK A signals are always associated with the input channel of highest priority which has a voice signal present indication stored in the JK flip-flops JK-FF1 through JK-FF15.

Section C of the decoder, the lowest section in order, includes two priority encoders C1 and C2, two 8-input multiplexers C1 and C2, and an OR gate 53. These elements are interconnected similarly to the elements of sections A and B. A group of eight NAND gates 34 are connected to the inputs of priority encoder C1 and a group of seven NAND gates 35 are connected to the inputs of priority encoder C2. The 15 NAND gates 34 and 35 each have an input connected to the $\overline{Q}$ output of an associated one of the JK flip-flops JK-FF1 through JK-FF15. The NAND gates also each have one input connected to the associated output of the BCD-to-octal converters A1 and A2 of section A and another input connected to the associated output of the BCD-to-octal converter B1 and B2 of section B. No inhibiting connection is required from priority encoder C1 to NAND gates 35 since section C is third in order and no more than three of the JK flip-flops at a time can store an indication as will be explained hereinbelow.

The elements of section C operate similarly to the elements of sections A and B to produce CLK C clock signals designating a particular input channel when three of the JK flip-flops store voice present indications. By virtue of the operation of the priority encoders in responding only to the input of highest priority, section C responds to the stored indication from the lowest numbered channel.

The inhibiting arrangement of the 15-to-3 decoder 12 which prevents more than three JK flip-flops from storing indications at the same time includes NOR gates 41, 42, 43, and 44. NOR gate 41 in section A produces a low level signal when either of the priority encoders A1 or A2 is responding to an indication. NOR gates 42 and 43 similarly produce low level signals when either priority encoder B1 or B2 in section B and C1 or C2 in section C, respectively, are responding to indications. Only when all three NOR gates 41, 42, and 43 produce low level signals does the output of NOR gate 44 become high. This signal is applied to the NOR gates, such as NOR gate 30, associated with each of the JK flip-flops holding the K-inputs to all the flip-flops low and preventing any additional flip-flops from being triggered to the reset state to store a voice present indication.

DIGITAL-TO-ANALOG AND ANALOG-TO-DIGITAL PROCESSING

As illustrated in FIG. 1 CLK A, CLK B, and CLK C clock signals from the decoder 12 operate to activate digital-to-analog converters A, B, and C 13, 14, and 15, respectively, during the appropriate time periods to receive digital signals from the proper input channels. The digital-to-analog converter 13 for the A path is illustrated in detail in FIG. 5. The other two digital-to-analog converters 14 and 15 for the B and C paths are identical except for external connections. The digital-to-analog converter 13 converts digital signals in the CVSD format to analog signals. The continuous variable slope delta modulation scheme is a specific variation of continuous delta modulation techniques as described under "Continuous Delta Modulation" which appeared in the Digest of Technical Papers of the IEEE International Symposium on Global Communications dated June 1964, Vol. 6, pages 38 and 39. Delta modulation techniques are also described in an article entitled "Companded Delta Modulation for Telephone Transmission" by Atsushi Tomozawa and Hisashi Kaneko appearing in the IEEE Transactions on Communication Technology dated February 1968, Vol. COM-16, No. 1, pages 149–157 and an article entitled "Companded Delta Modulation for Telephony" by Stephen J. Brolin and James M. Brown appearing in the same issue of the same journal at pages 157–162.

Figure 7:
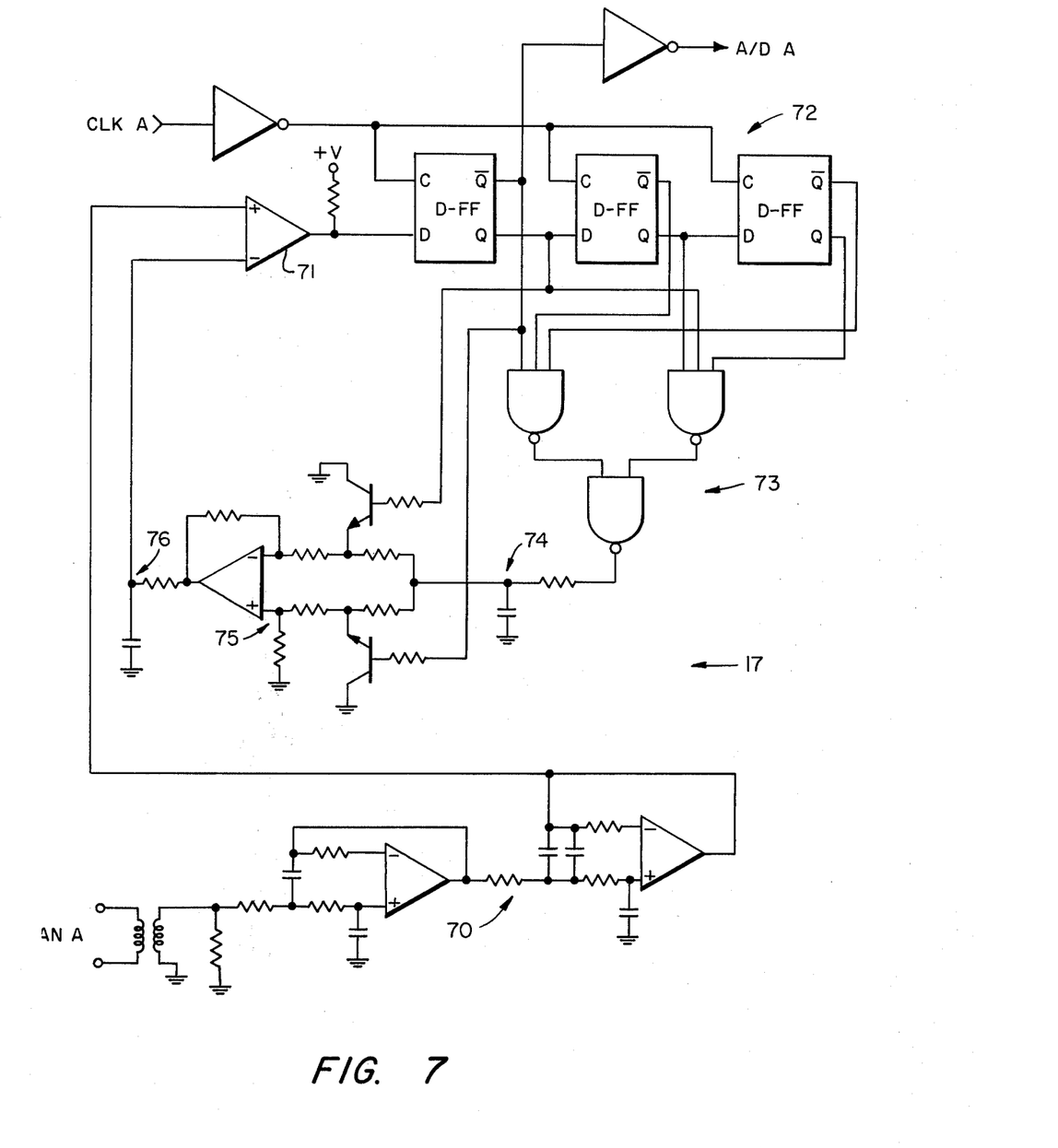
FIG. 7 is a schematic diagram of an analog-to-digital converter of the apparatus.

The essentials of the CVSD technique employed with the present apparatus may best be understood by reference to FIG. 7 which illustrates an analog-to-digital converter 17. In the CVSD technique analog voice signals are applied to the input labeled AN A. The analog signal is passed through a two-stage active low pass filter 70 and applied to one input of an analog comparator 71. The analog-to-digital converter also includes a three-stage shift register 72 which is clocked at the 38.4 KHz rate, specifically by the CLK A clock signal. The outputs of the stages of the shift register 72 are applied to a decoder 73, and the output of the decoder is applied to a smoothing integrator 74. The output of the integrator 74 is applied to a pulse height modulator 75. The polarity of the output from the pulse height modulator is controlled by connections to the first stage of the shift register. The output of the pulse height modulator is applied through a loop integrator 76 to the other input of the analog comparator 71. The output of the analog comparator 71 is applied to the shift register 72. The digital output A/D A is taken from the first stage of the shift register.

The analog-to-digital converter 17 encodes voice signals into a serial digital bit stream at the 38.4 KHz rate. The technique depends on the fact that when the level of the analog input to the converter is increased, more runs of consecutive digits of the same polarity are produced at the digital output A/D A. The converter operates by comparing the filtered analog input AN/A with the feedback approximation from the loop integrator 76. The output of the analog comparator 71 is a logic 1 if the input voltage from the low pass filter 70 is more positive than the approximation feedback voltage from the loop integrator 76 and a logic 0 if less. The output of the analog comparator is sampled at the 38.4 KHz rate and three consecutive bits are stored in the shift register 72. The decoder 73 produces a 1 if the three bits in the shift register 72 are all 1's or all 0's. The decoder output pulses are smoothed by the smoothing integrator 74 and applied to the pulse height modulator 75. The pulse height modulator 75 produces a pulse the amplitude of which is a linear function of its input voltage. If a 1 is stored in the first stage of the shift register 72, a positive gain is produced by the pulse height modulator 75, and if a 0 is stored in the first stage, a negative gain is produced. An approximated analog input signal is produced by the loop integrator 76 which integrates the height modulated pulses.

Figure 5:
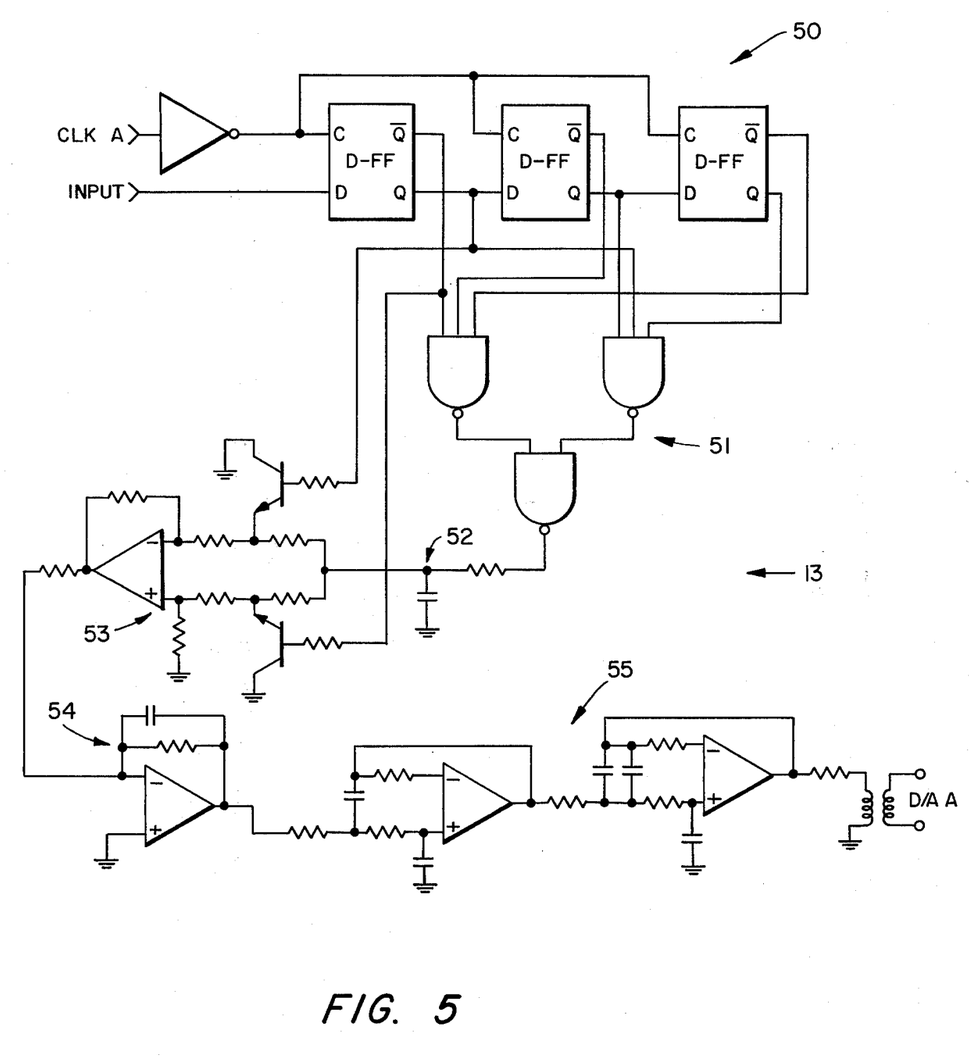
FIG. 5 is a schematic diagram of a digital-to-analog converter employed in the apparatus.

The digital-to-analog converter 13 as illustrated in FIG. 5 includes a three-stage shift register 50, a decoder 51, a smoothing integrator 52, a pulse height modulator 53, an integrator 54, and a low pass filter 55. Digital signals are clocked into the shift register from the INPUT line by the CLK A clock signals at the 38.4 KHz rate. The decoder 51, integrator 52, pulse height modulator 53, and integrator 54 operate in the same manner as the corresponding portions of the analog-to-digital converter as explained hereinabove to produce a decoder analog signal. This signal is passed through the low pass filter 55 to prevent the quantizing noise and other high frequency components from appearing in the output signal D/A A.

Figure 6:
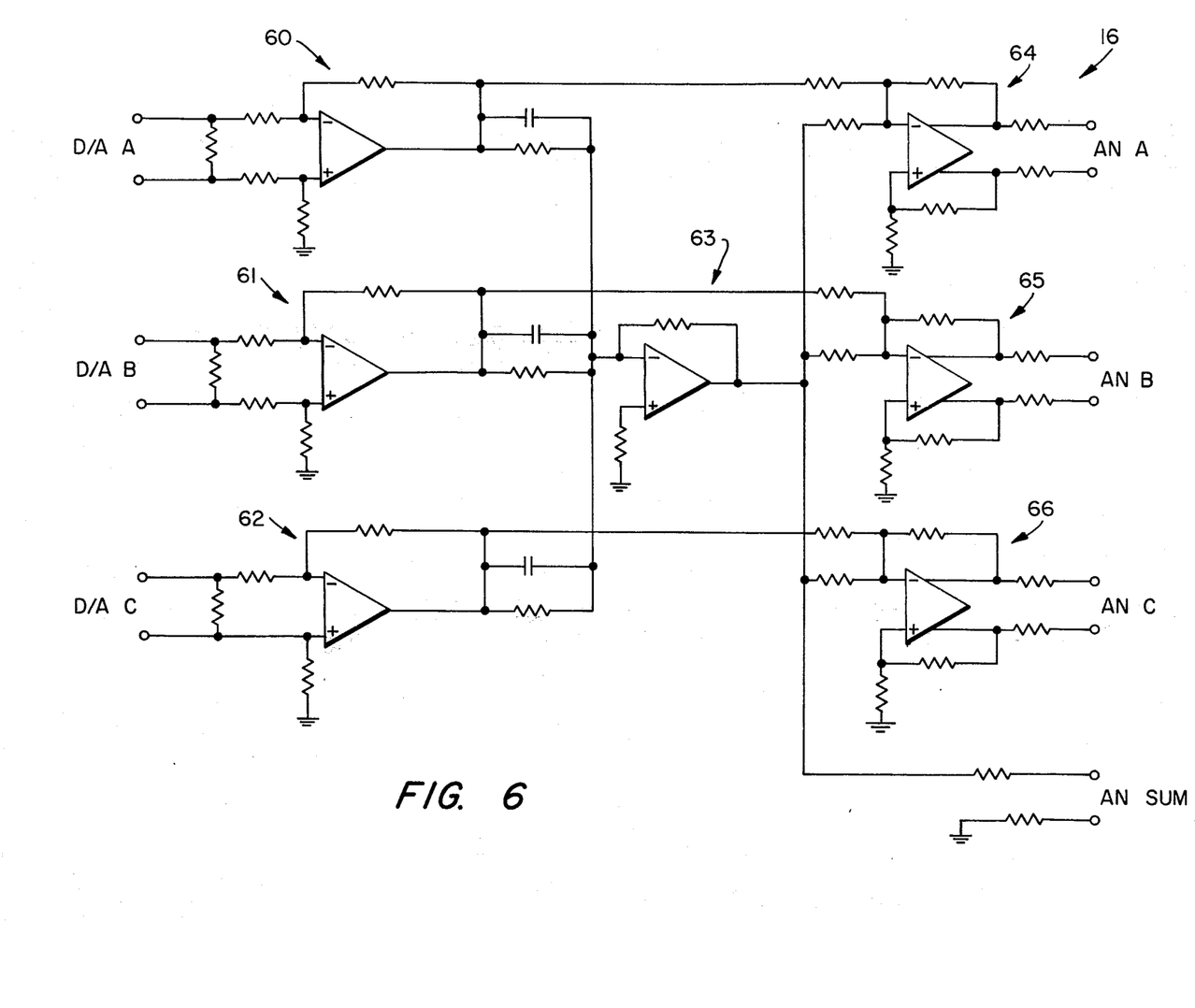
FIG. 6 is a schematic diagram of an analog conference bridge of the apparatus.

The outputs D/A A, D/A B, and D/A C from the three digital-to-analog converters 13, 14, and 15 are applied to the similarly designated inputs of the analog bridge circuit 16 as shown in detail in FIG. 6. The analog bridge circuits 16 is a well-known type having three inputs and four outputs AN A, AN B, AN C, and AN SUM.

The analog bridge circuit has three input sections 60, 61, and 62 for receiving analog signals on up to three paths. The outputs of the three input sections are combined in a summing section 63. The input sections 60, 61, and 62 are each coupled to a corresponding output section 64, 65, and 66, respectively. The summing section 63 is coupled to each of the output sections. Each output section produces an output signal which is the difference between the output from the summing section 63 and its corresponding input section. Thus, the AN A output from output section 64 contains none of the analog signal present in the D/A A input signal, but does contain any analog signal present in the D/A B and D/A C inputs. Similarly the AN B output from output section 65 contains the analog signals present in the D/A A and D/A C inputs, and the AN C output from output section 66 contains the analog signals present in the D/A A and D/A B inputs. The AN SUM output from the summing section 63 is the sum of all the analog signals present in the three inputs D/A A, D/A B, and D/A C.

As shown in FIG. 1 the four outputs AN A, AN B, AN C, and AN SUM from the analog bridge circuit 16 are applied to analog-to-digital converters 17, 18, 19, and 20, respectively. The analog-to-digital converters operate as explained previously to encode the analog signals AN A, AN B, AN C, and AN SUM to digital signals A/D A, A/D B, A/D C, and A/D SUM, respectively. The analog-to-digital converters are clocked at the 38.4 KHz rate. The particular clock pulses used is of no significance. In the present example the clock pulses associated with the input channel is used for the A, B, and C analog-to-digital converters 17, 18, and 19 and the CP1 clock pulse is used for the SUM analog-to-digital converter 20.

Output Multiplexing

As illustrated in FIG. 1 the outputs A/D A, A/D B, A/D C, and A/D SUM from the analog-to-digital converters 17, 18, 19, and 20, respectively, are applied to an output multiplexer 21. The output multiplexer is operated by the CLK A, CLK B, and CLK C clock signals which designate the particular input channels from which signals have been taken for processing by the apparatus. The output multiplexer 21 is illustrated in the logic diagram of FIG. 8.

Figure 8:
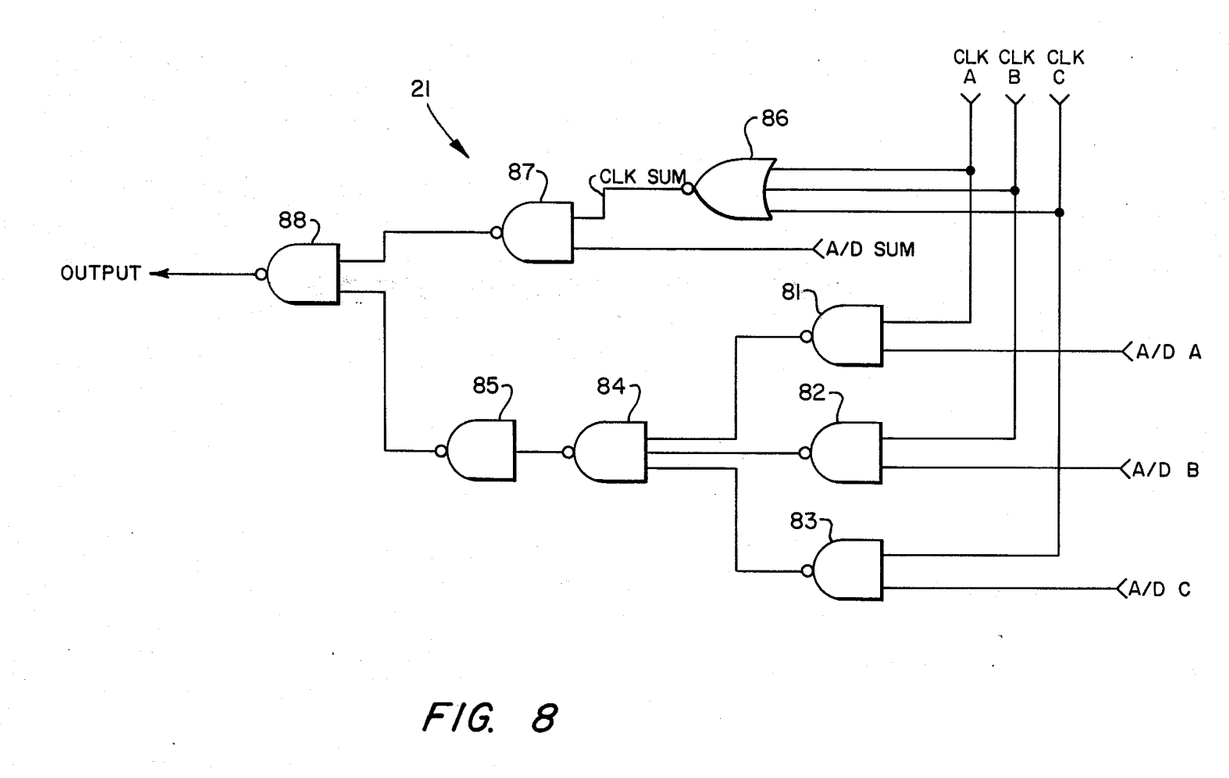
FIG. 8 is a logic diagram of an output multiplexer of the apparatus.

The A/D A signal and the CLK A clock signal are applied to the two inputs of a NAND gate 81. Similarly the A/D B and CLK B clock signals are applied to a NAND gate 82 and the A/D C and CLK C clock signals are applied to a NAND gate 83. The outputs of NAND gates 81, 82, and 83 are connected to a NAND gate 84 which has its output connected to an inverter 85.

The CLK A, CLK B, and CLK C clock signals are also applied to a NOR gate 86 to produce a CLK SUM signal. This signal and the A/D SUM signal from the SUM analog-to-digital converter 20 are applied to a NAND gate 87. The outputs of NAND gate 87 and the inverter 85 are applied to a NAND gate 88 which is connected to the OUTPUT line.

The multiplexer operates in the following manner to pass digital signals from the analog-to-digital converters to the OUTPUT line at the appropriate times so as to be in the proper output channels. During each CLK A clock signal the A/D A digital signal from the A analog-to-digital converter 17 passes through NAND gates 81 and 84, inverter 85, and NAND gate 88 to the OUTPUT line. As indicated by the timing diagram of FIG. 9 this digit will be applied to the OUTPUT line in the time period for the output channel associated with the input channel designated by the CLK A clock signal. By virtue of the operation of the analog bridge circuit 16 as explained hereinabove the information in the designated output channel is not the information which was present in the same input channel, but is the information applied to the B and C paths by the CLK S and CLK C clock signals. Similarly, during each CLK B and CLK C clock signal, if present, an A/D B and A/D C digit which contains information from the two channels other than the designated input channel is applied to the respective designated output channel.

During the CLK A, CLK B, and CLK C clock signals the CLK SUM signal from the NOR gate 86 is low inhibiting NAND gate 87. Thus, the A/D SUM digit from the SUM analog-to-digital converter 20 is prevented from entering any of the output channels designated by the CLK A, CLK B, or CLK C signals during the transmission of A/D A, A/D B, or A/D C signals. When neither the CLK A, CLK B, or CLK C clock signal is present, the CLK SUM signal is high permitting the A/D SUM digit to pass through NAND gate 87 and then through NAND gate 88 to the OUTPUT line. Thus the A/D SUM data which is the sum of all the voice signal information present in paths A, B, and C is transmitted on all output channels except those designated by a CLK A, CLK B, or CLK C clock signal.

Operation

Details of the operation of the digital conference bridge apparatus as described may best be understood by a specific example involving certain signals illustrated in FIG. 9. For purposes of explanation it is assumed that input channels 12, 7, and 1 each have voice information present at the same instant. The shift registers 12, 7, and 1 of the digital voice detector 11 (FIG. 3) detect the presence of the voice information by storing four consecutive 1's with sufficient repetitiveness to cause monostable multivibrators 12, 7, and 1 to produce low level output signals CH12, CH7, and CH1.

The CH12, CH7, and CH1 indications of voice present are applied to the JK flip-flops JK-FF12, JK-FF7, and JK-FF1 in the 15-to-3 decoder (FIG. 4). With the JK-FF12 flip-flop triggered to the reset condition its Q output is low causing the priority encoder A1 of section A to respond thereto and produce a BCD output signal appropriately identifying input channel 12. Priority encoder A1 also produces a low level signal to the arrangement of NAND gates 31 preventing the $\overline{Q}$ output signals from flip-flops JK-FF7 and JK-FF1, which are also in the reset condition, from reaching priority encoder A2.

The BCD output from the priority encoder A1 is applied to the BCD-to-octal converter A1 causing that converter to produce a low level signal on its output line indicating channel 12. This signal is applied to the appropriate NAND gates of NAND gate arrangements 32 and 34 which are connected to flip-flops JK-FF12. Priority encoders B1 and C1 of sections B and C are thus inhibited from responding to the $\overline{Q}$ output of flip-flop JK-FF12.

The BCD output from the priority encoder A1 indicating channel 12 is also applied to the 8-input multiplexer A1. The multiplexer A1 thus permits CP12 clock pulses to pass through to the multiplexer output. These pulses pass through OR gate 51 to become the CLK A clock signals as indicated in FIG. 9. Thus, the CLK A clock signals designate channel 12 (FIG. 9) and channel 12 digital voice information enters the A path through the digital-to-analog converters, the analog conference bridge, and the analog-to-digital converters.

The CH7 low level indication of voice present from the digital voice detector 11 causes JK flip-flop JK-FF7 to be triggered to the reset condition producing a high level signal at its $\overline{Q}$ output. Since the priority encoder A1 in section A is responding to the indication stored in JK flip-flop JK-FF12, all the NAND gates of arrangement 31 are inhibited and priority encoder A2 cannot respond to the signal from JK flip-flop JK-FF7. The NAND gate arrangement 33 which is connected to the flip-flop JK-FF7 is receiving high level signals from both the BCD-to-octal converter A2 and the priority encoder B1. Priority encoder B2 therefore responds to the $\overline{Q}$ output from JK flip-flop JK-FF7 producing a BCD output signal identifying channel 7. The BCD-to-octal converter B2 receives this signal and produces a low level signal on its appropriate output line inhibiting the NAND gate of arrangement 35 which is connected to flip-flop JK-FF7.

The BCD output from priority encoder B2 designating channel 7 is also applied to the 8-input multiplexer B2. During each CP7 clock pulse the 8-input multiplexer B2 produces an output pulse which passes through the OR gate 52 to become the CLK B clock signal. Thus, CLK B clock signals designate channel 7 (FIG. 9), and channel 7 data is applied to the B path through the digital-to-analog converters, the analog conference bridge, and the analog-to-digital converters.

The CH1 low level indication from the digital voice detector 11 causes JK flip-flops JK-FF1 to be triggered to the reset condition producing a high level signal at its Q output. Since channel 1 is established as of lower priority than channel 7, even though the high level signal passes through the appropriate NAND gate of arrangement 35, it has no effect on priority encoder B2 which responds to the signal from the JK flip-flop JK-FF7. The NAND gate of arrangement 35 which is connected to flip-flop JK-FF1 is enabled by high level signals from the BCD-to-octal converters B2 and A2 in sections B and A, respectively. Priority encoder C2 then receives and responds to the signal stored in flip-flop JK-FF1 and produces a BCD output signal to the 8-input multiplexer C2 identifying channel 1 as the selected channel. On the CP1 clock pulses the 8-input multiplexer C2 produces pulses which pass through the OR gate 53 to become the CLK C clock signals. Thus, the CLK C clock signals and the C path through the digital-to-analog converters, analog conference bridge, and analog-to-digital converters are designated for channel 1 (FIG. 9).

The digital signals from input channels 12, 7, and 1 are converted to analog signals D/A A, D/A B, and D/A C by the digital-to-analog converters 13, 14, and 15, respectively. These signals are combined by the analog conference bridge 16 so that the AN A output signal contains channel 7 and channel 1 voice information, the AN B output signal contains channel 12 and channel 1 voice information, the AN C output signal contains channel 12 and channel 7 voice information, and the AN SUM output signal contains the voice information from channels 12, 7, and 1.

The four analog signals AN A, AN B, AN C, and AN SUM are converted to digital signals A/D A, A/D B, A/D C, and A/D SUM by the analog-to-digital converters 17, 18, 19, and 20, respectively. These digital signals are applied to the output multiplexer 21. Under control of the CLK A, CLK B, and CLK C clock signals which occur coincident with the CP12, CP7, and CP1 clock pulses, respectively, the output multiplexer 21 applies these digital signals to the OUTPUT line.

Specifically, during the time period of output channel 1 the CLK C clock signal enables NAND gate 83 and the A/D C digital signal, which is derived from the voice information received on input channels 7 and 12, is applied to the OUTPUT line. During the time period of output channel 2 since neither CLK A, CLK B, nor CLK C clock signals are present, the CLK SUM signal enables NAND gate 87 and the A/D SUm digital signal, which is derived from the information received on input channels 1, 7, and 12 is applied to the OUTPUT line. Similarly, during the time periods of output channels 3 through 6 the CLK SUM signal is present causing the A/D SUM signal to be applied to the OUTPUT line. The CLK B clock signal occurs during the time period of output channel 7 enabling NAND gate 82 and permitting the A/D B digital signal, which contains voice information from input channels 1 and 12, to pass to the OUTPUT line. During the time periods of channels 8 through 11 the CLK SUM signal enables NAND gate 87 permitting the A/D SUM digital signal to pass to the OUTPUT line. The CLK A clock signal occurs during the time period of output channel 12 enabling NAND gate 81 and permitting the A/D A digital signal, which contains voice information from input channels 1 and 7, to pass the OUTPUT line. Also during the time period of output channels 13, 14, and 15 the CLK SUM signal enables NAND gate 87 and the A/D SUM digital signal passes to the OUTPUT line.

The apparatus continues to operate in this manner transmitting voice information from input channels 1, 7, and 12 to all subscribers involved in the conference. If any other input channels contain voice information, the appropriate section of the voice detector 11 responds to produce a CH indication. However, by virtue of the signals from priority encoders A1, B2, and C2 through NOR gates 41, 42, and 43, respectively, NOR gate 44 produces an inhibiting signal to the JK flip-flops JK-FF1 through JK-FF15 preventing any additional flip-flops from being reset to store an indication. When the voice detector 11 fails to detect a digital voice signal on input channels 1, 7, or 12 for a period greater than 100 milliseconds, the respective indications CH1, CH7, or CH12 terminates. The inhibiting signal from NOR gate 44 to the JK flip-flops JK-FF1 through JK-FF15 also terminates and another indication may be stored in one of the JK flip-flops. The apparatus continues to operate as explained responding to up to the maximum of three indications stored in the JK flip-flops to direct signals derived from the signals present in the indicated input channels to all the channels taking part in the conference.

While there has been shown and described what is considered a preferred embodiment of the present invention, it will be obvious to those skilled in the art that various changes and modifications may be made therein without departing from the invention as defined in the appended claims.

What is claimed is:

1. Digital conference bridge apparatus comprising
a plurality of M input channels for transmitting digital signals;
a plurality of M output channels, each output channel corresponding to a different one of said input channels;
detection means coupled to said input channels for detecting the presence of digital signal information thereon;
a group of N digital-to-analog converting means for converting digital signals to analog signals;
decoder means coupled to said detection means and to said digital-to-analog converting means, said decoder means being operable individually to couple said digital-to-analog converting means to up to N input channels having digital signal information present thereon;
analog bridge means having N input connections and N+1 output connections, each of N of the output connections corresponding to an input connection and the other output connection being a summing output connection;
each of said digital-to-analog converting means being coupled to a different one of the N input connections of said analog bridge means;
said analog bridge means being operable to produce at each of the N output connections the analog signals present at all but the corresponding one of said N input connections, and being operable to produce at the summing output connection an analog signal which is the sum of the analog signals present at said input connections;
a group of N+1 analog-to-digital converting means for converting analog signals to digital signals, each of said analog-to-digital converting means being coupled to a different one of the N+1 output connections of said analog bridge means; and
output multiplexing means coupled to said analog-to-digital converting means, to said decoder means, and to said plurality of output channels for applying digital signals from particular analog-to-digital converting means to particular output channels.

2. Digital conference bridge apparatus comprising
an input transmission line for transmitting digital signals during a recurring sequence of M time periods corresponding to M input channels;
an output transmission line;
a group of N digital-to-analog converting means for converting digital signals to analog signals, said digital-to-analog converting means being coupled to said input transmission line;
control means coupled to said input transmission line and to said digital-to-analog converting means for individually enabling said digital-to-analog converting means to receive digital signals from said input transmission line during the same time period of each recurring sequence during the presence of digital signal information in up to N of said M time periods;
analog bridge means having N input connections and N+1 output connections, each of N of the output connections corresponding to an input connection and the other output connection being a summing output connection;
each of said digital-to-analog converting means being coupled to a different one of the N input connections of said analog bridge means;
said analog bridge means being operable to produce at each of the N output connections the analog signals present at all but the corresponding one of said N input connections, and being operable to produce at the summing output connection an analog signal which is the sum of the analog signals present at said input connections;
a group of N+1 analog-to-digital converting means for converting analog signals to digital signals, each of said analog-to-digital converting means being coupled to a different one of the N+1 output connections of said analog bridge means; and
output multiplexing means coupled to said analog-to-digital converting means, to said control means, and to said output transmission line for applying digital signals from particular analog-to-digital converting means to said output transmission line during particular time periods corresponding to output channels.

3. Digital conference bridge apparatus comprising
an input transmission line for transmitting time division multiplexed digital signals for a plurality of M input channels;
an output transmission line for transmitting time division multiplexed digital signals for a plurality of M output channels, each output channel corresponding to a different one of said input channels;
detection means coupled to said input transmission line for detecting the presence of digital signal information and for producing indications identifying the input channels having digital signal information thereon;
decoder means coupled to said detection means for producing clock signals on up to N clock signal lines during the presence of digital signal information on corresponding input channels in response to indications from said detection means;
a group of N digital-to-analog converting means, each being coupled to said input transmission line and to a different one of said clock signal lines for converting digital signals received during clock signals to analog signals;
analog bridge means having N input connections, each connected to a different one of said digital-to-analog converting means, and N+1 output connections, each of N of the output connections corresponding to an input connection and the other output connection being a summing output connection;
said analog bridge means being operable to produce at each of the N output connections the analog signals present at all but the corresponding one of said N input connections, and being operable to produce at the summing output connection an analog signal which is the sum of the analog signals present at said input connections;

a group of N+1 analog-to-digital converting means for converting analog signals to digital signals, each of said analog-to-digital converting means being coupled to a different one of the N+1 output connections of said analog bridge means; and output multiplexing means coupled to said analog-to-digital converting means, to said clock signal lines, and to said output transmission line for applying digital signals from particular analog-to-digital converting means to the output transmission line on particular output channels.

4. Digital conference bridge apparatus in accordance with claim 3 including timing means for producing clock pulses in a recurring sequence on each of M clock pulse lines in series, each clock pulse line being associated with an input channel and having a clock pulse present thereon during each time period of the associated input channel;

and wherein said detection means includes a plurality of M detector circuit means, each being coupled to said input transmission line and to a different one of said clock pulse lines from the timing means, each detector circuit means being operable during clock pulses on the associated clock pulse line to detect the presence of digital signal information on the input transmission line during the time periods of the associated input channel and to produce an indication in response thereto; and said decoder means includes a plurality of M storage means each being coupled to a different one of said detector circuit means for storing an indication therefrom;

inhibiting means for preventing more than N storage means from storing an indication at the same time, N decoding circuit means arranged in order, each being coupled to said M storage means and to said M clock pulse lines of the timing means and each having a clock signal line, each decoding circuit means being operable when enabled to respond to an indication from any single one of said storage means and to produce a clock signal on its clock signal line during each clock pulse associated with the input channel identified by the indication to which it is responding, and enabling means for enabling the highest of said N decoding circuit means in the order which is not responding to an indication.

5. Digital conference bridge apparatus in accordance with claim 4 wherein said output multiplexing means is operable during a clock signal associated with an input channel to prevent digital signals derived from digital signals on the input channel from being applied to the associated output channel and is operable during the absence of a clock signal associated with an input channel to apply digital signals derived from digital signals on the input channel to the output channels other than the associated output channel.

6. Digital conference bridge apparatus in accordance with claim 4 wherein said output multiplexing means includes a first output gating means coupled to the N analog-to-digital converting means which are not coupled to the summing output connection of the analog bridge means, to the N clock signal lines, and to the output transmission line; said first output gating means being operable during a clock signal associated with an input channel to permit digital signals from the analog-to-digital converting means which is coupled to the output connection of the analog bridge means having its corresponding input connection connected to the digital-to-analog converting means which is coupled to the clock signal line having the same clock signal thereon to be applied to the output transmission line only during the time period of the associated output channel; and a second output gating means coupled to the analog-to-digital converting means which is coupled to the summing output connection of the analog bridge means, to the N clock signal lines, and to the output transmission line; said second output gating means being operable to prevent digital signals from the analog-to-digital converting means which is coupled to the summing output connection of the analog bridge means from being applied to the output transmission line during the time periods of output channels associated with clock signals and being operable to permit digital signals from the analog-to-digital converting means which is coupled to the summing output connection of the analog bridge means to be applied to the output transmission line during the time periods of output channels not associated with a clock signal.

7. Digital conference bridge apparatus in accordance with claim 6 wherein said time division multiplexed digital signals are constituted of a single binary digit during each time period of each input channel; and each of said M detector circuit means includes shift register means coupled to the input transmission line and to one of said clock pulse lines for continually storing the most recent of several successive digits associated with an input channel, detector decoding means coupled to the shift register means for producing an output signal when a particular combination of digits are stored in the shift register means, the particular combination occurring only when the stored digits indicate the presence of information in the digital signals, and multivibrator means coupled to the detector decoding means and to a storage means of the decoder means, said multivibrator means being triggered by each occurrence of an output signal from the detector decoding means to produce an indication which persists for a period of time after termination of the output signal.

8. Digital conference bridge apparatus in accordance with claim 7 wherein each of said decoding circuit means of said decoder means includes priority encoding means coupled to said M storage means, said priority encoding means being operable to respond to only one indication at a time and to produce an output signal identifying the input channel associated with the indication to which it is responding, clock signal gating means coupled to the M clock pulse lines, to the priority encoding means, and to a clock signal line, said clock signal gating means being operable to produce a clock signal on the clock signal line during the clock pulse occurring during the time period of the input channel identified by the output signal from the priority encoding means;

said enabling means of said decoder means includes N-1 enable gating means, a different one of the enable gating means being connected between the M storage means and the priority encoding means of each decoding circuit means except the decoding circuit means of highest order, each priority encoding means being coupled to the enable gating means associated with the decoding circuit means of next lower order, each enable gating means being operable to prevent the passage of indications therethrough from the storage means to the associated priority encoding means if any of the priority encoding means of higher order is not responding to an indication, and being operable when all the priority encoding means of higher order are responding to indications to permit the passage of indications therethrough from the storage means to the associated priority encoding means except for indications being responded to by the priority encoding means of higher order, and said inhibiting means of said decoder means includes inhibit gating means coupled to the N priority encoding means and to the M storage means and operable when all N priority encoding means are responding to indications from N of the storage means to prevent the remaining storage means from storing indications from the associated multivibrator means of said detection means.

* * * * *